Jan. 23, 1962   R. H. CHAMPION   3,018,119
TAMPER-PROOF INSULATED PIPE COUPLING
Filed Jan. 16, 1961
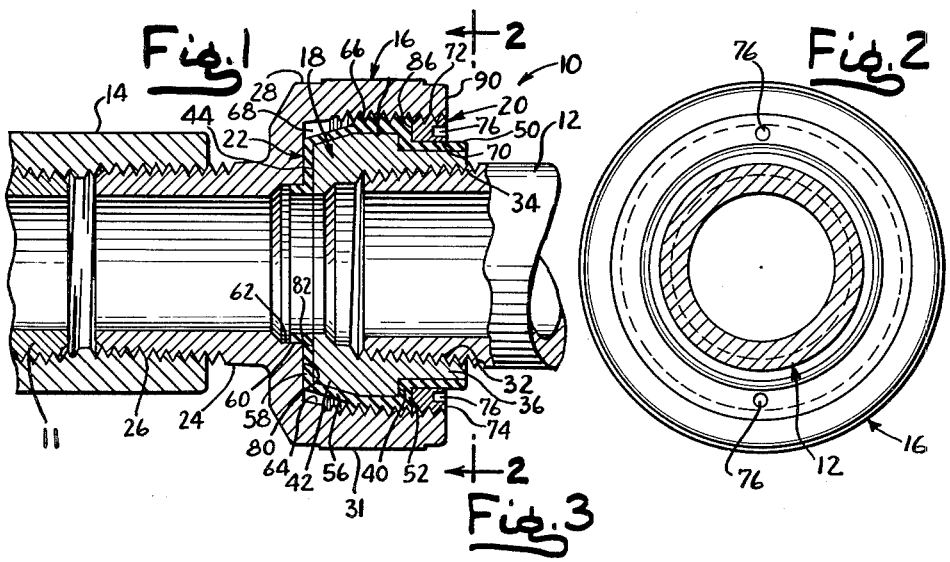
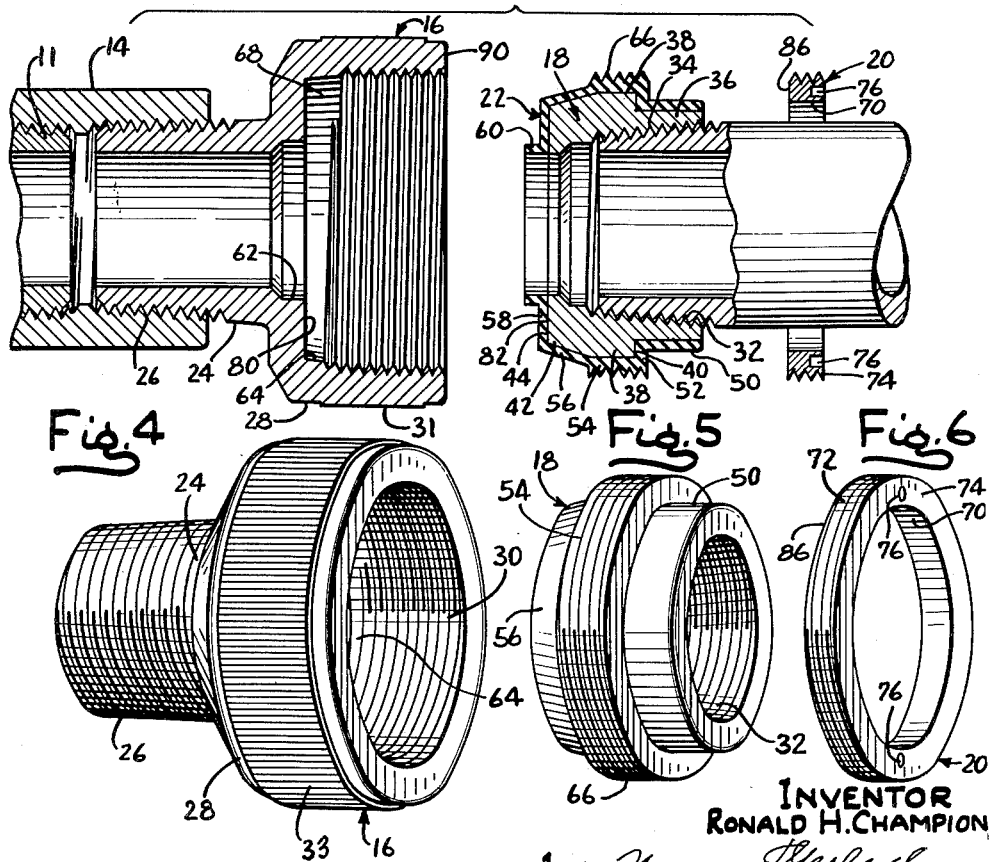
INVENTOR
RONALD H. CHAMPION
by: Norman H. Gerlach
ATTY.

United States Patent Office 3,018,119
Patented Jan. 23, 1962

3,018,119
TAMPER-PROOF INSULATED PIPE COUPLING
Ronald H. Champion, Rockford, Ill., assignor to Eclipse Fuel Engineering Co., Rockford, Ill., a corporation of Illinois
Filed Jan. 16, 1961, Ser. No. 82,766
2 Claims. (Cl. 285—50)

The improved insulated pipe coupling comprising the present invention has been designed for use primarily in connection with a gas distribution pipe which leads from an underground gas main and is connected to household or other building lead-in piping extending to various gas outlet points where gas appliances are employed. The invention is, however, capable of other uses and the present coupling may, if desired, be employed for connecting the adjacent ends of tubular pipes or conduits containing inflammable gases or liquids, regardless of the nature of the installation or the use to which it may be put. For illustrative purposes herein, the invention has been shown and described as assuming the form of a pipe coupling for the adjacent ends of a pair of axially aligned pipe sections, but it will be understood that the invention may assume other forms, as for example, the form of an elbow coupling, a coupling for a gas cock, a sleeve or union type meter bar and the like. Irrespective, however, of the particular use to which the present insulated pipe coupling may be put, or the form which it may assume, the essential features of the invention are at all times preserved.

It is common but dangerous practice to ground electric or electronic apparatus such as the electric motors for air conditioning apparatus, dehumidifiers and the like, or radio or television receivers, etc. to household gas piping. Not only is this dangerous from the standpoint of possible ignition or explosion of leaking gas, but it invariably creates a condition which is conducive toward electrolytic deterioration due to the galvanic battery effect which takes place when a potential differential, however slight, is established between an embedded conduit and the surrounding earth in which it is embedded.

The present invention is designed to overcome the above-noted limitations which are attendant upon conventional uninsulated coupling devices and, toward this end, it contemplates the provision of a novel form of coupling which not only effectively connects adjacent pipe sections together but also insulates the two sections in such a manner as to prevent the flow of electric current from one pipe section to the other.

The pipe coupling which forms the subject matter of the present application is of the same general type which is shown and described in copending United States patent application Serial No. 533,585, filed on September 12, 1955 by Gerald L. Anderson and entitled "Insulated Pipe Union" and now abandoned. The general objects of the present invention are substantially the same as those set forth in the above-mentioned application and include the provision of a coupling including a head and a tailpiece together with an insulating sleeve which may be formed of molded nylon or other appropriate moldable material having high dielectric properties and possessing an appreciable degree of resistance to compressional forces, yet which to a certain extent is resilient, and which surrounds and is shaped conformably to the tailpiece and serves, when a coupling nut associated therewith is tightened at the time of assembly, to form a fluid-tight joint between the opposed surfaces of the head and tailpiece, while at the same time insulating these surfaces from each other.

The insulated coupling of the present invention is designed as an improvement over the coupling device of the above-mentioned copending patent application in that, by virtue of an novel design and arrangement of parts, the over-all axial extent of the coupling as a whole may be materially shortened without destroying its effectiveness.

Another object of the present invention is to provide a package-type insulated coupling which may be completely and permanently assembled at the factory, and transported bodily to the scene of installation and installed thereat without requiring loosening or separation of its various component parts. Because a permanent assembly is made at the factory, the coupling may be tested before being sent into the field so that there will be no danger of improper or imperfect assembly in the field, the only care or attention which is required being to insure complete and full threaded connection between the coupling and the adjacent ends of the conduits or pipe sections to which the coupling is to be applied.

A still further object of the invention is to provide a package-type insulated coupling of this sort which, during the field installation thereof, as, for example, when applying the same to the adjacent ends of two axially aligned pipe sections, will be subjected to no torque application which would tend to loosen, further tighten, or otherwise alter the predetermined fixed relationship between the various constituent parts of the coupling. By such an arrangement, the electrical barrier created between certain component parts of the coupling will remain a permanent one, both during and after installation due to the fact that there can be no opening up of the coupling to admit dirt or other foreign material which might present a low resistance path for electrical leakage, or any pinching, rupturing or other distortion of the insulating component which establishes the electrical barrier.

Yet another object of the invention is to provide an insulated coupling of the aforementioned character and wherein the component parts thereof are self-locking so that after assembly thereof turning of one part relatively to another is prevented.

A still further object of the invention is to provide an insulated coupling including, in addition to a coupling head and a tailpiece, the following parts: (1) an insulating sleeve which completely surrounds the tailpiece and has a threaded portion which makes threaded engagement with the coupling head; and (2) a locking ring which also makes threaded engagement with the coupling head, is interposed between the head and the tailpiece, and functions during assembly of the parts to place the insulating sleeve under compression so as to establish a fluid seal between the head and the tailpiece, while at the same time during tightening thereof, it exerts no appreciable tortional force on the sleeve or the tailpiece about which the sleeve is molded to the end that turning of the tailpiece within the body of the head is not necessary to draw the parts tightly together to effect the desired fluid seal.

Finally, it is an object of the invention to provide an insulated coupling in which the heretofore-mentioned locking ring is so designed that it cannot be tampered with in the field, a special tool being required for its removal from the assembly.

With these and other objects in view, which will become more readily apparent as the following description ensues, the invention consists in the novel construction, combination and arrangement of parts as shown in the accompanying single sheet of drawing forming a part of this specification.

In this drawing:

FIG. 1 is a longitudinal sectional view taken substantially centrally through an insulated coupling constructed in accordance with the principles of the present invention and showing the same operatively connecting the adjoining ends of a pair of axially aligned pipes;

FIG. 2 is a sectional view taken along the line 2—2 of FIG. 1 and showing the coupling in end elevation;

FIG. 3 is an exploded sectional view of the coupling of FIG. 1, the section being taken substantially longitudinally and centrally through the coupling;

FIG. 4 is a perspective view of the head of the coupling;

FIG. 5 is a perspective view of the coupling tailpiece with the insulating sleeve molded thereon; and FIG. 6 is a perspective view of the locking ring of the coupling.

Referring now to the drawings in detail wherein a preferred embodiment of the invention has been shown for illustrative purposes, the pipe coupling of the present invention has been designated in its entirety at 10 and it serves as a medium for connecting and electrically insulating the adjacent ends of a pair of aligned pipes 11 and 12. One of these pipes may be a section of house or other building piping, while the other pipe may be a gas distribution pipe. The pipe 12 is directly connected to the coupling 10 as will be described presently, while the pipe 11 is connected to the coupling 10 by way of a threaded fitting 14 of conventional design.

The coupling 10 involves in its general organization four principal parts, namely, a head 16, a tailpiece 18, a locking ring 20, and an insulating sleeve 22. The sleeve is formed of moldable material and encompasses or surrounds the tailpiece 18. The head 16, the tailpiece 18 and the locking ring 20 may be formed of any suitable metal such as steel or brass, while the sleeve 22 is preferably formed of molded nylon, Teflon, or natural or synthetic rubber, or a rubber substitute or other elastomeric material, or any one of a number of suitable plastic materials which are capable of being molded and possess the necessary insulating characteristics electrically to insulate the head 16 from the tailpiece 18.

The head 16 of the coupling is of tubular configuration. It is in the form of a one-piece metallic element, either cast or machined, and embodies at its outer or forward end a sleeve portion 24 which is threaded exteriorly as at 26 for threaded reception in internally threaded fitting 14. The inner or rear end of the head 16 constitutes a head proper 28 and is of greater diameter than the sleeve portion 24. The head proper is provided with a series of internal screw threads 30 while the cylindrical outer surface of the head proper is knurled as at 31 for cooperation with a suitable tool such as a pipe wrench which may be employed for installing the sleeve portion 24 of the head 16 in the fitting 14.

The tailpiece 18 of the coupling device is tubular. It is in the form of a one-piece metallic element of ring-like design and has a central bore which is provided with internal screw threads 32. The threads 32 are adapted to receive the external threads 34 on the pipe 12. The tailpiece 18 is provided with a cylindrical section 36 at the rear end thereof, a second cylindrical section 38 of larger diameter establishing a rearwardly facing annular shoulder 40, and a frusto-conical section 42 adjacent to the forward end of the tailpiece. The forward end of the tailpiece 18 is provided with a flat annular radial surface 44.

The sleeve 22 completely surrounds the tailpiece 18 and is shaped conformably to the outer cylindrical surface of the latter, as well as to the forward radial end face 44 thereof. The sleeve thus embodies a short cylindrical portion 50, a short radial portion 52, a second cylindrical portion 54, a frusto-conical portion 56, and a second radial portion 58, as well as a short forwardly extending lip 60. This lip 60 fits within a reduced bore 62 in the head 16, the previously mentioned screw threads 30 being provided internally in an enlarged counterbore 64 in the head. The cylindrical section 54 of the insulating sleeve 22 is exteriorly threaded as at 66 and this threaded portion is designed for threaded reception in the counterbore 64 by cooperation with the screw threads 30. It is to be noted at this point that the frusto-conical section 56 of the insulating sleeve 22 clears the forward end region of the counterbore 64 and defines in combination therewith a small annular pocket 68 which establishes a clearance region for cold flow of the nylon or other material from which the sleeve is formed.

It is contemplated that in connection with the formation of the sleeve 22, the tailpiece 18 will be placed in a suitable mold, the inner surface of which is shaped conformably to, but spaced outwards from, the outer surface of the sleeve. After proper mounting of the tailpiece 18 in the mold, the latter will be filled with uncured nylon or other moldable plastic material and the material then subjected to heat and pressure in order to polymerize or otherwise cure the material and thus form the sleeve 22. Because of the heat and pressure in the molding operation, the sleeve will firmly and intimately grip the external surface of the tailpiece which it encompasses and thus it is not likely to turn relatively thereto during assembly of the parts or during use thereafter.

The locking ring 20 is adapted to be interposed between the cylindrical portion 50 of the insulating sleeve 22 and the internally threaded portion of the counterbore 64 of the head 16. The locking ring 20 has a smooth cylindrical inner surface 70 while the outer surface thereof is externally threaded as at 72 for cooperation with the screw threads 30. The rear or outer end of the locking ring 20 is formed with a flat annular radial surface 74 which is provided with a pair of diametrically opposite small sockets 76 (see FIG. 6). The sockets 76 are designed for reception therein of the tangs of a suitable wrench (not shown) whereby the ring may be screwed into position within the assembly.

The herein described coupling is designed for assembly at the factory rather than in the field to the end that the coupling may be made under controlled conditions which will assure the desired sealing and insulating characteristics whereby the tailpiece 18 is effectively sealed to the head 16, while at the same time these two parts are electrically insulated from one another. After the factory installation or assembly has been completed, it is not contemplated that the parts will again be dismantled and the coupling may be shipped for subsequent use in the field where it is merely necessary to apply the fitting 14 and its associated pipe 11 to the threaded portion 26 of the head 16, and to thread the pipe section 12 into the threaded portion 30 of the tailpiece 18. By resorting to factory assembly, the coupling 10 may be tested for both fluid and electrical leakage.

In the factory assembly operation, the tailpiece 18 with the insulating sleeve 22 molded thereon, is threaded into the counterbore 64 of the head 16 until such time as the radial section 58 of the insulating sleeve abuts against the forwardly facing shoulder 80 which exists at the juncture between the bore 62 and the counterbore 64. This threading operation involves threaded cooperation between the nylon threads of the insulating sleeve 22 and the metal threads 30 of the head 16. The threading operation is continued only until a mild degree of pressure exists on the radial surface 44 of the insulating sleeve by virtue of its compression between the shoulder 80 and the front face 82 of the tailpiece 18. Thereafter the locking ring 20 is threaded into the counterbore 64 so that the short radial portion 22 of the insulating sleeve 22 is compressed between the shoulder 40 and the front face 86 of the locking ring 20. The threading operation is continued until the radial portion 52 is placed under a considerable degree of compression, whereupon the pressure applied to the shoulder 40 will cause the tailpiece 18 to be shifted bodily forwardly to such an extent that the larger radial portion 58 of the sleeve 22 will likewise be placed under compression with the shoulder 80 acting as a reaction surface for assimilating the thrust of the locking ring 20. This bodily shifting of the tailpiece 18 forwardly is made possible by virtue of the fact that the molded plastic material of the sleeve 22 is deformable to a slight extent without rupture so that the restraining action offered by the threaded engagement between the screw threads 66 and 30 is overcome. The pressure thus applied to the material of the insulating sleeve 22 in the regions of both radial portions 52 and 58 will create a cold flow of the material of the sleeve so that some of this material will flow from the radial portion 52 into the threaded cylindrical portion 54, while some of it will flow into the cylindrical portion 50. This cold flow of the material will place both the portion 50 and the portion 54 under compression and cause these portions to "swell," so to speak, and effect a firm binding between the threads 66 and the threads 30. This binding action will become effective as soon as initial pressure is applied to the radial portion 52 and it will prevent any relative turning movement between the tailpiece 18 and the head 16 during assembly operations.

It is well known that when threaded cooperation takes place between two elements which are formed of materials of different hardness, stripping of the threads of the element which is comprised of the softer material is likely to occur as final tightening operations are being performed. The present coupling assembly is so designed that the final tightening operations between the tailpiece 18 and the coupling head 16 is effected, not by relative turning movement of one element relative to the other to effect thread-tightening, but rather by expansion of the material of the portion containing the softer threads whereby these threads of the sleeve are forced into intimate contact with the metal threads with which they cooperate.

The axial extent of the locking ring 22 is such that when the ring is threaded into the counterbore 64 to the extent set forth above, radial surface 74 thereof will lie substantially flush with the rear face 90 of the coupling head 16 so that the locking ring cannot be removed without use of a special tool having tangs for cooperation with the sockets 76.

It is to be noted that in the assembled coupling, the axial extent of the tailpiece 18 is such that a small portion thereof projects outwardly beyond the rear end face 88 of the locking ring 20, as does a small portion of the cylindrical portion 50 of the insulating sleeve. This small projecting portion of the cylindrical portion 50 prevents building up of any deposit of foreign conductive material which might provide a low resistance path for current leakage between the two metal parts. The lip 60 at the other end of the sleeve 22 performs a similar function.

The invention is not to be limited to the exact arrangement of parts shown in the accompanying drawing or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. A pipe coupling adapted releasably to connect and electrically to insulate the opposed adjacent ends of a pair of axially aligned, metallic, fluid-conducting members in close proximity to and in fluid communication with each other, said coupling comprising a tubular metallic head embodying at its rear end a head proper of enlarged internal diameter and from which there extends forwardly an integrally formed threaded sleeve portion of reduced diameter designed for threaded cooperation with an end of one of said fluid-conducting members, said head proper being provided with an inner surface presenting a series of internal threads, said head presenting an internal rearwardly facing radial shoulder in the region of juncture between the sleeve portion and the head proper, a tubular metallic tailpiece in axial alignment with said head and at least partially nested within the head proper, said tailpiece having a flat annular radial end surface which is disposed in opposition to said rearwardly facing radial shoulder on the head, a medial cylindrical section and a rear cylindrical section of reduced diameter immediately rearwardly of the medial cylindrical section, said tailpiece presenting a radial annular shoulder at the juncture between the medial cylindrical section and the rear cylindrical section, said tailpiece being internally threaded for reception therein of an end of the other of said fluid-conducting members, a tubular insulating and sealing sleeve formed of a deformable insulating material possessing a considerable degree of resistance to compressional forces encompassing said tailpiece and having a flat radial portion interposed between said shoulder on the head and said radial end surface on the tailpiece, a medial portion surrounding the medial cylindrical section of the tailpiece, a rear cylindrical portion surrounding the rear cylindrical section of the tailpiece, and a narrow radial portion in contact with the radial annular shoulder on the tailpiece, said sleeve being axially coextensive with the tailpiece and being coextensively bonded thereto, said medial cylindrical portion of the sleeve being formed with a series of external threads in threaded engagement with the internal threads on the head proper, and a metallic locking ring disposed within said head proper and surrounding at least a portion of the rear cylindrical portion of the insulating sleeve, said locking ring presenting a radial end face bearing against the flat radial portion of the insulating and sealing sleeve, said locking ring being provided with a series of external threads in threaded engagement with the internal threads on the head proper, said locking ring serving to compress the narrow radial portion of the insulating and sealing sleeve against said radial shoulder on the tailpiece and thus bias the tailpiece as a whole bodily forwardly within the head proper against the restraining action of the threads on the insulating and sealing sleeve and to, in turn, compress the flat radial portion of the insulating and sealing sleeve between the radial end surface of the tailpiece and the internal rearwardly facing radial shoulder of the head.

2. A pipe coupling as set forth in claim 1 and wherein said tubular metallic tailpiece is formed with a frusto-conical section immediately rearwardly of the flat annular radial end surface, said frusto-conical section, in combination with a portion of said rearwardly facing radial shoulder on the head and with a portion of the inner surface of the head, defining a clearance void for cold flow of the material of the insulating and sealing sleeve when the radial portions thereof are compressed, and wherein said insulating and sealing sleeve is formed with a frusto-conical portion surrounding the frusto-conical section of the tailpiece.

References Cited in the file of this patent

UNITED STATES PATENTS

| | | |
|---|---|---|
| 500,822 | Strauss | July 4, 1893 |
| 2,574,191 | Platzer | Nov. 6, 1951 |
| 2,726,101 | Peterson | Dec. 6, 1955 |